(12) United States Patent
Ambs

(10) Patent No.: US 6,253,549 B1
(45) Date of Patent: Jul. 3, 2001

(54) TOROIDAL HYDRAULIC ACTUATOR

(76) Inventor: Loran D. Ambs, 5443 Windrush, Fulshear, TX (US) 77441

( * ) Notice: Subject to any disclaimer, the term of this patent is extended or adjusted under 35 U.S.C. 154(b) by 0 days.

(21) Appl. No.: 09/299,962

(22) Filed: Apr. 26, 1999

(51) Int. Cl.[7] .................................................. F16D 31/02
(52) U.S. Cl. ................... 60/371; 91/508; 91/534
(58) Field of Search ............................... 60/371; 91/508, 91/533, 534

(56) References Cited

U.S. PATENT DOCUMENTS

| | | | |
|---|---|---|---|
| 3,482,646 | * | 12/1969 | Brown et al. . |
| 3,703,849 | * | 11/1972 | Renner et al. ...................... 91/533 X |
| 3,818,801 | * | 6/1974 | Kime .................................. 91/533 X |
| 4,143,736 | * | 3/1979 | Fair . |
| 4,691,803 | * | 9/1987 | Martin ................................. 181/113 |
| 4,882,979 | * | 11/1989 | Weyer ................................. 91/533 X |
| 4,922,804 | * | 5/1990 | Goldenberg ......................... 91/533 X |
| 5,189,263 | * | 2/1993 | Bearden ............................. 181/113 |
| 5,360,951 | * | 11/1994 | Turpening ........................... 181/113 |

* cited by examiner

*Primary Examiner*—Hoang Nguyen

(57) ABSTRACT

A hydraulic actuator comprised of a toroidal piston within a toroidal enclosure, with differential fluid pressure alternatively applied to upper and lower surfaces of the piston to cause a reciprocating motion, and with plural double ended piston rods extending in parallel above and below the piston, and slidably extending in fluid sealed relation through end caps of the toroidal enclosure to distribute the vibrational force produced by the reciprocating piston over plural points of a surface area of the mass to be vibrated, thereby reducing the likelihood of stress, strain, or harmonics in the mass.

6 Claims, 5 Drawing Sheets

TOROIDAL HYDRAULIC ACTUATOR

FIELD OF THE INVENTION

The invention relates generally to seismic vibrators for imparting a force onto a baseplate in contact with earth materials, and more particularly to a seismic vibrator for vibrating masses with reduced likelihood of inducing stress, strain, or harmonics.

BACKGROUND OF THE INVENTION

Land vibrators are known which include a base plate in contact with the earth, a reaction mass, and a linear actuator for reciprocating the reaction mass relative to the base plate.

U.S. Pat. No. 3,745,885 discloses a conventional hydraulic vibrator with a cylindrical piston and cylinder. More particularly, the vibrator is comprised of a double acting drive piston slidably received within a cylinder formed in a reaction mass. When hydraulic fluid is introduced into the cylinder alternately on opposite faces of the piston, the reaction mass is forced into reciprocal motion.

Marine vibrators also are known which employ a reaction mass in the same manner as land vibrators, where a reciprocating force is imparted to a single baseplate in contact with the water. Other marine vibrators, such as that disclosed in U.S. Pat. No. 3,482,646, substitute the reaction mass of a land vibrator with a second baseplate substantially identical to the first. A flexible seal between the baseplates allows them to move with respect to each other without compromising the watertight integrity of the assembly. Each baseplate works against the mechanical and reactive impedance of the other one to form a pair of acoustic projector surfaces experiencing equal and opposite forces, and therefore moving in opposite directions.

Other known actuators, some of which are not applicable as seismic vibrators, are described in the following patent summaries:

U.S. Pat. No. 3,172,338 discloses a hydropneumatic actuator which acts as a tool and die manipulator, rather than a vibrator. The actuator includes three coaxial, concentric, and coextensive cylinders, with each cylinder having in slidable relation therewith a piston. Not all pistons have double ended rods. If equal pressure is applied to each side of the piston, therefore, an unbalanced force is generated, and hence an asymmetrical displacement of stroke occurs.

U.S. Pat. No. 4,143,736 discloses a seismic transducer for generating waves in an elastic medium. The transducer includes a reaction mass with parallel cylinders formed therein, and a piston member slidably received in each cylinder. Each piston includes a double ended rod, with one rod end connected to an energy coupling plate in contact with the elastic medium to be vibrated. A pressurized fluid supply, pressurized fluid storage, manifold and servo valve are used to introduce hydraulic fluid alternately to opposite sides of the pistons to induce a reciprocal motion into the reaction mass.

U.S. Pat. No. 4,178,838 discloses a seismic energy vibrator which includes a reaction mass with parallel cylinders into which pistons with a double ended rod are reciprocally received. One rod end of each piston is attached to an energy coupling plate in contact with the earth. When hydraulic fluid is alternately introduced to opposite sides of the pistons, the reaction mass is forced into reciprocal motion. One aspect of the disclosed invention is that hydraulic flow porting is simplified to provide only a single hydraulic flow passage for each piston rod, thereby improving structural integrity.

U.S. Pat. No. 4,386,889 discloses a positive displacement pump having a plurality of slidably reciprocating, concentric, annular pistons mounted between parallel walls of the pump. When the pistons are reciprocated in a predetermined and controlled sequence, the fluid is caused to flow through the pump. The purpose of the apparatus is to pump liquid, not to produce vibrations.

U.S. Pat. No. 4,424,012 discloses an in-line pump having a cylinder in which an annular piston is reciprocally driven to cause fluid to flow along a fluid carrying line. The piston rods are single ended, and thus produce asymmetrical forces on the up and down strokes. The pump is valved in such a way that an applied reciprocating force on the single-ended piston rods produces a unidirectional flow of oil in the inlet and outlet ports. In the present invention, a reciprocating flow of pressurized fluid produces a symmetrical force on the piston which is transmitted through double ended piston rods to vibrate external masses.

U.S. Pat. No. 4,608,675 discloses a toroidal piston in a toroidal enclosure with only one chamber formed between the base of the piston and the base of the enclosure. The piston is of sufficient size to act as the reaction mass. The rapid release of air into the chamber transmits an impulse into the ground as the baseplate of the enclosure is pushed against the inertia of the piston to produce seismic energy. No coherent vibrational energy, however, is produced. That is, no reciprocating vibrational force is produced.

U.S. Pat. No. 4,691,803 discloses a seismic energy generating system including a base plate in contact with the earth, a master cylinder filled with water that is mounted on the base plate, and a receiving cylinder within the master cylinder into which a projectile is fired to generate a hydraulic force that is coupled through the base plate to the earth. This device is another impulse generator, and does not produce a reciprocating vibrational force.

U.S. Pat. No. 4,939,983 discloses a fluid pressure operated positioning apparatus which includes a ring enclosure having coaxial inner and outer walls, and an annular piston surrounding the inner enclosure wall. Axially parallel piston rods are connected to the annular piston, and extend in a sealed manner through one or both enclosure end caps. The positioning apparatus is used to apply a continuous force between two objects, generate rotational motion, control a robotic manipulator arm, or position a workpiece or table for machining or grinding. No reciprocating vibrational force is produced.

U.S. Pat. No. 5,189,263 discloses a portable geophysical energy source including an earth-coupling element, a seismic energy source connected to the earth-coupling element, a lower water container placed between the seismic energy source and the earth coupling element to act as a hold-down mass, and an upper water container placed above the seismic energy source to act as a reactance mass. The hydraulic actuator used in the system is of a conventional circular piston in a cylinder design.

U.S. Pat. No. 5,360,951 discloses a seismic energy source which includes a first plate resting on the earth's surface, one or more piezoelectric transducers mounted on the first plate to convert electrical energy into mechanical vibrating energy, and a second plate resting on top of the transducers and anchored to the earth by an earth clamping mechanism. When electrical energy is imparted to the transducers, a mechanical vibratory motion is imparted into the earth through the first plate.

U.S. Pat. No. 5,410,946 discloses a die press with a dual stage hydraulic actuator having a single cylinder body with a pressure chamber in which a first piston and a second piston are independently slidably inserted. Each piston includes plural single ended piston rods which protrude through only one end of the cylinder, and which are equally spaced circumferentially. The piston rods of the first piston are surrounded by the piston rods of the second piston. The cylinder body has a center column which allows the first piston to separate first and second pressure chambers, and the second piston to separate second and third pressure chambers. The first and second pistons are advanced by introducing pressured oil into the first pressure chamber, and then the second pressure chamber. The pressurized oil in the second pressure chamber acts as a rigid fluid connector to transmit the movement of the first piston to the second piston. Asymmetric rather than symmetric forces are produced on either side of the pistons given the same fluid pressure.

U.S. Pat. No. 5,701,801 discloses a mechanically redundant actuator with structurally redundant members, which attach the actuator body between a stationary anchor point and a movable control surface of an aircraft. The actuator is comprised of a single circular piston within a cylinder. The piston rods are double ended.

None of the above prior art describes an actuator in which a reciprocating flow of fluid produces a symmetrical force on the piston which is transmitted through double ended piston rods in a manner to distribute a reciprocating vibrational force over a large surface area of the mass to be vibrated, thereby reducing likelihood of inducing strain, stress, or harmonics in the mass.

SUMMARY OF THE INVENTION

The present invention is a hydraulic actuator comprised of a toroidal enclosure, a toroidal piston disposed within the toroidal enclosure and having plural double ended piston rods slidably extending in a fluid sealed manner through end caps of the toroidal enclosure, with the toroidal piston defining upper and lower chambers of the toroidal enclosure into which hydraulic fluid is alternately introduced to force the piston into reciprocal motion to vibrate external masses.

In one aspect of the invention, same fluid pressures in the reciprocating fluid flow produces equal forces on the faces of the piston, and thus symmetrical up and down strokes of the piston.

In another aspect of the invention, the plural double ended piston rods distribute the force generated by the actuator over plural points of a surface area of the mass being vibrated to reduce the likelihood of stress, strain, or harmonics in the mass.

In still another aspect of the invention, the toroidal enclosure may act as a reaction mass or may be connected to a reaction mass.

BRIEF DESCRIPTION OF THE DRAWINGS

The accompanying drawings, which are incorporated in and constitute a part of the specification, illustrate a preferred embodiment of the invention, and together with the general description given above and the detailed description of the preferred embodiment given below, serve to explain the principles of the invention.

DESCRIPTION OF PREFERRED EMBODIMENTS

In the descriptions which follow, like reference numbers refer to same elements.

Figure 1:
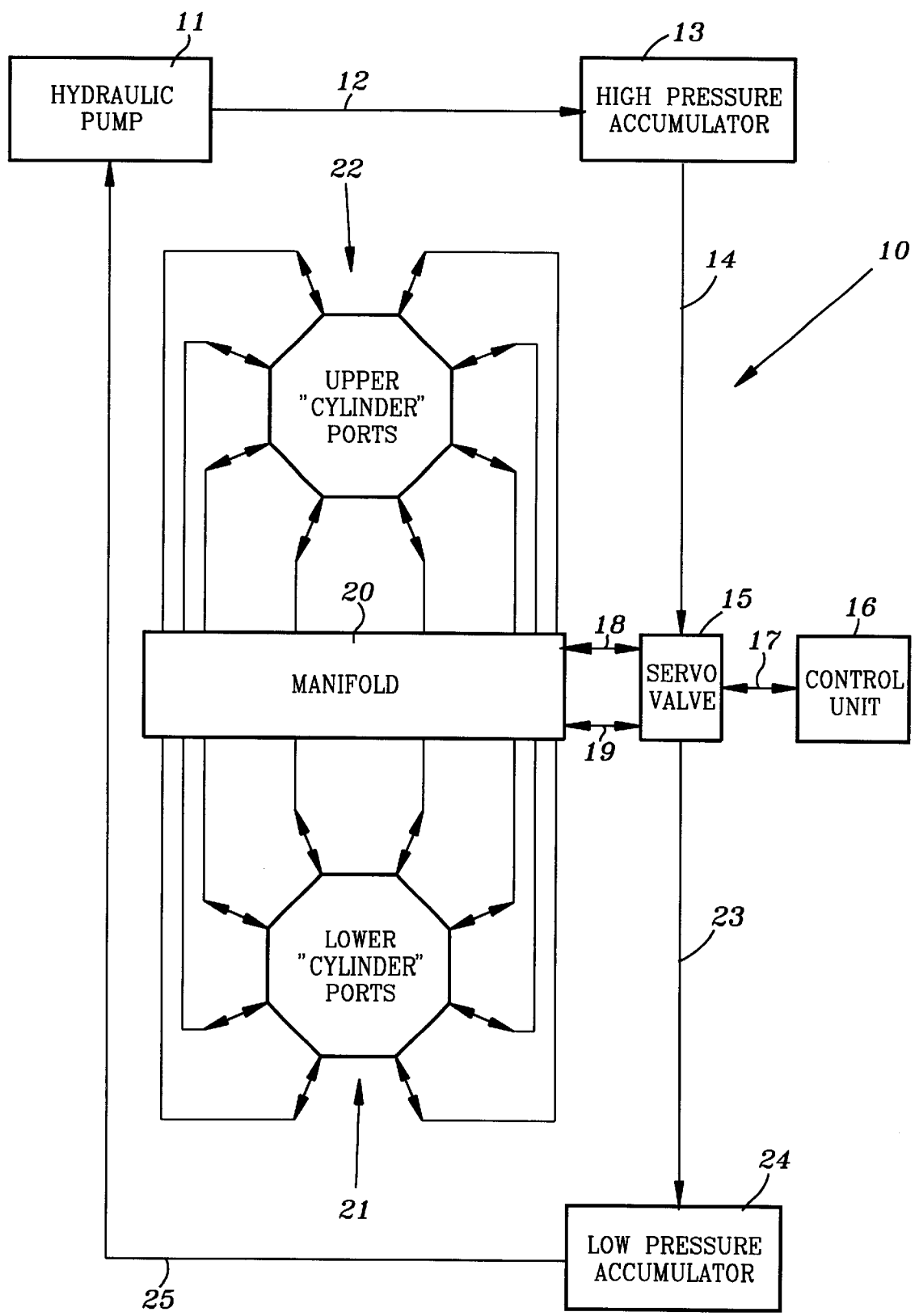
FIG. 1 is a functional block diagram of a hydraulic/electronic system of a seismic vibrator in accordance with the invention.

Referring to FIG. 1, a functional block diagram of a seismic vibrator system 10 is shown which comprises a hydraulic pump 11 that supplies a hydraulic liquid such as oil under pressure along a hydraulic flow line 12, and through a high pressure accumulator 13 to a hydraulic flow line 14 leading to a servo valve 15.

A control unit 16 controls the operation of the servo valve 15 by issuing control signals on a conducting line 17. The servo valve 15, in response to the control unit 16, channels the high pressure oil from accumulator 13 through one of flow lines 18 and 19 to a manifold 20. The manifold 20 in turn channels oil flow between lower chamber ports 21 and flow line 19, and between upper chamber ports 22 and flow line 18. The lower chamber ports 21 communicate the oil to a lower chamber bounded by a lower surface of a toroidal piston slidably seated within a toroidal enclosure, and the upper chamber ports 22 communicate the oil to an upper chamber of the toroidal enclosure bounded by an upper surface of the toroidal piston. By application of high pressure oil first to one chamber, and then to the other chamber, the piston is caused to reciprocate within the toroidal enclosure. The force generated by the piston is the product of piston surface area and differential piston pressure. Conventional hydraulic vibrators may produce a maximum pressure differential of the order of 3,000 psi.

As the toroidal piston is forced to move either upward or downward within the toroidal enclosure by application of high pressure oil through the high pressure accumulator 13, the servo valve 15, and the manifold 20, lower pressure oil is forced out of the toroidal enclosure and through manifold 20 to one of flow lines 18 and 19. The low pressure oil received by the servo valve 15 from flow lines 18 and 19 is applied along a hydraulic flow line 23 to a low pressure accumulator 24. The low pressure accumulator causes the oil to be returned by way of a hydraulic flow line 25 to the hydraulic pump 11.

More particularly, upon command of the control unit 16, servo valve 15 establishes a conduit to direct high pressure oil from the high pressure accumulator 13 to the lower chamber of the toroidal enclosure, and a conduit to displace lower pressure oil in the upper chamber into the low pressure accumulator 24. As a result, the toroidal piston moves upward. In like manner, when control unit 16 commands the servo valve 15 to establish a conduit to direct high pressure oil from the high pressure accumulator 13 to the upper chamber of the toroidal enclosure, and a conduit to displace lower pressure oil in the lower chamber to the low pressure accumulator, the toroidal piston moves downward. By alternately pressurizing the upper and lower chambers of the toroidal enclosure, the toroidal piston is driven in a reciprocating motion.

The forces generated on either side of the toroidal piston to cause the reciprocating motion are equal forces produced by equal pressures in the upper and lower chambers of the toroidal enclosure. A symmetrical displacement on the up and down strokes of the toroidal piston thereby occurs.

The control unit 16 thus operates to cause the toroidal piston to reciprocate within the toroidal enclosure. The motion energy of the reciprocating piston is coupled to the land or water mass in which vibration energy is to be introduced.

The hydraulic pump 11, high pressure accumulator 13, control unit 16, servo valve 15, and low pressure accumulator 24 are commercially available products incorporated into conventional land vibrators which may be purchased from any one of the following vendors: Input/Output Incorporated, 11104 West Airport Boulevard, Stafford, Tex. 77477 (Model 362); Sercel Incorporated, 17155 Park Row, Houston, Tex. 77128(Model M26HD/623B); and Industrial Vehicle International, Incorporated, 6737 East 12th Street, Tulsa, Okla. 74112 (Model Hemi 60).

Figure 2:
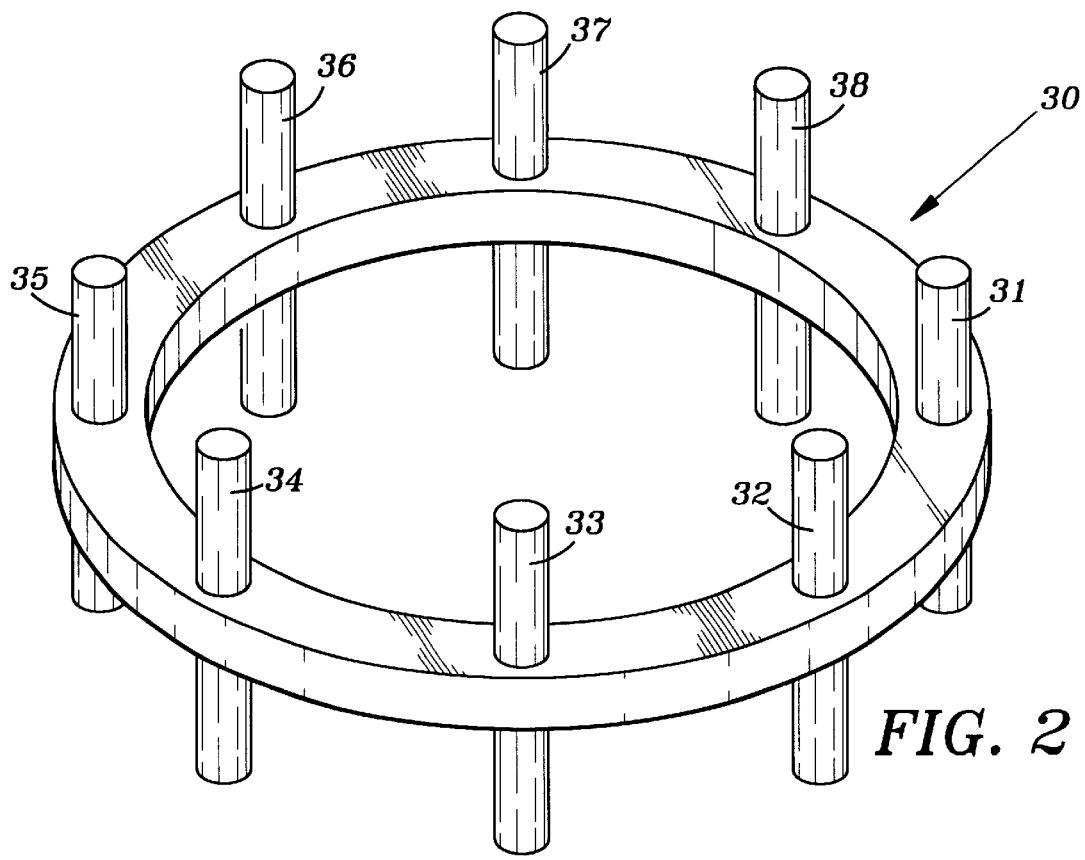
FIG. 2 is a perspective view of a toroidal hydraulic piston in accordance with the invention.

Referring to FIG. 2, a doughnut or toroidal shaped piston 30 is illustrated with eight parallel rods 31, 32, 33, 34, 35, 36, 37, and 38 spaced around a circumference of the piston, and extending through and perpendicular to the toroidal ring of the piston 30. Each of the rods 31-38 extends above and below the toroidal piston 30.

Figure 3:
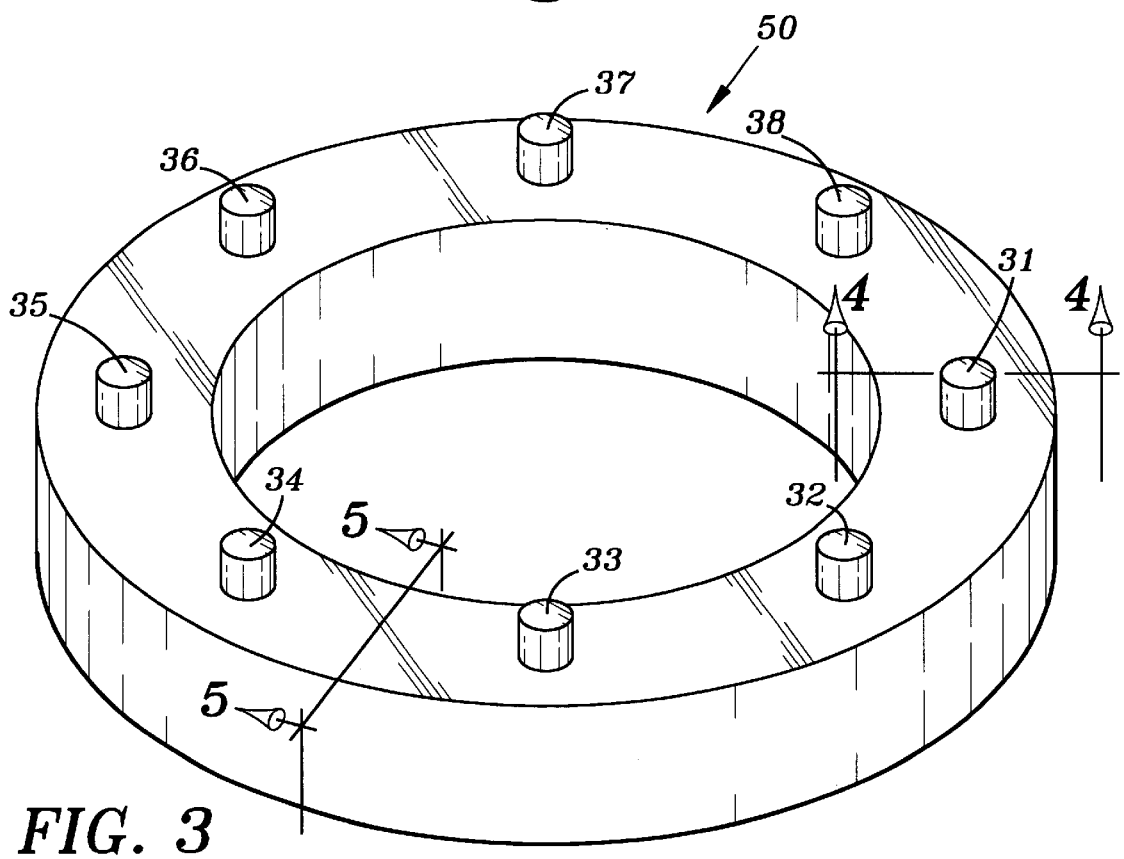
FIG. 3 is a perspective view of a toroidal enclosure for housing the toroidal piston of FIG. 2.

FIG. 3 illustrates a toroidal enclosure 50 within which the toroidal piston 30 of FIG. 2 is slidably enclosed. The rods 31-38 of piston 30 extend slidably and in a fluid sealed manner through the end cap 51 of the toroidal enclosure 50 to impart the motion of the toroidal piston 30 to the mass to be vibrated. It is to be understood that the toroidal enclosure 50 may constitute the reaction mass of the vibrator 10, or the toroidal enclosure 50 may be attached to the reaction mass.

Figure 4:
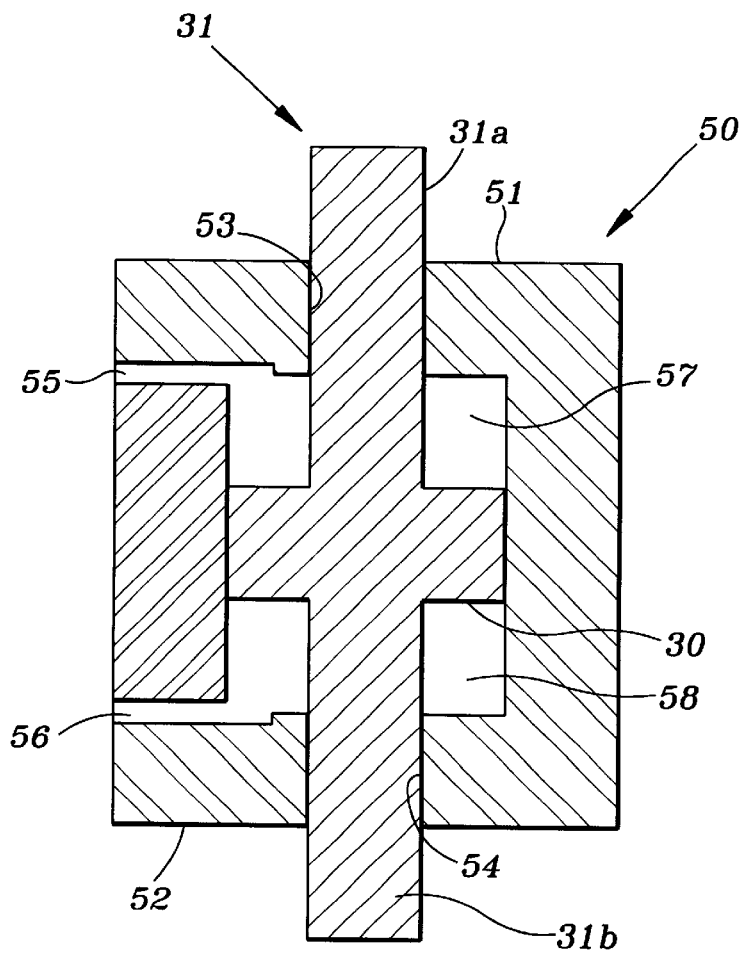
FIG. 4 is a cross-sectional view of the toroidal enclosure 50 along line 4—4 of FIG. 3.

FIG. 4 is a cross-sectional view of the hydraulic actuator of the present invention along line 4—4 of FIG. 3, with toroidal piston 30 slidably seated within toroidal enclosure 50. Rod 31 is affixed to toroidal piston 30 with rod ends 31a and 31b slidably extending through endcaps 51 and 52 of the toroidal enclosure 50. The packing and liquid sealing methods used to allow the rod 31 to slidably extend through boreholes 53 and 54 are conventional and well known. An upper oil port 55 leads to an upper hydraulic chamber 57 for applying oil under pressure to the upper surface of toroidal piston 30 to move the piston downward, and allow the oil in chamber 57 to flow out of the chamber 57 as the piston moves upward. A lower oil port 56 leads to a chamber 58 of toroidal enclosure 50 to apply oil under pressure to the lower surface of toroidal piston 30 to move the piston upward, and to allow the oil in chamber 58 to flow out from the chamber 58 when the toroidal piston 30 moves downward. Chambers 57 and 58 are circularly disposed above and below toroidal piston 30 without interruption within the toroidal enclosure. The reciprocating movement of the toroidal piston 30 is transmitted by way of rod 31 to a mass to be vibrated.

In the above description, it is to be understood that oil port 55 is one of upper chamber ports 22 of FIG. 1, and that oil port 56 is one of lower chamber ports 21 of FIG. 1.

Figure 5:
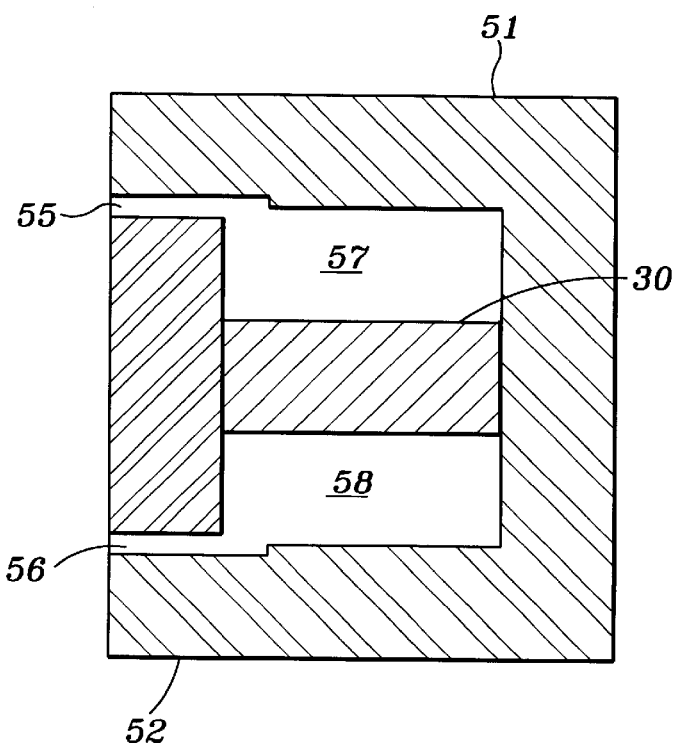
FIG. 5 is a cross-sectional view of the toroidal enclosure 50 along line 5—5 of FIG. 3.

FIG. 5 is a cross-sectional view of the hydraulic actuator of the present invention along line 5—5 of FIG. 3. When oil is applied under pressure to the upper oil port 55, the toroidal piston 30 moves downward to force the oil in chamber 58 to flow out of the lower oil port 56. In like manner, when oil under pressure enters the lower oil port 56, the toroidal piston 30 is moved upward to force the oil in chamber 57 to flow out of the upper oil port 55. By alternately applying high pressure oil to ports 55 and 56, the toroidal piston 30 is forced into a reciprocating motion which is coupled to a mass by way of the rods 31–38.

Figure 6:
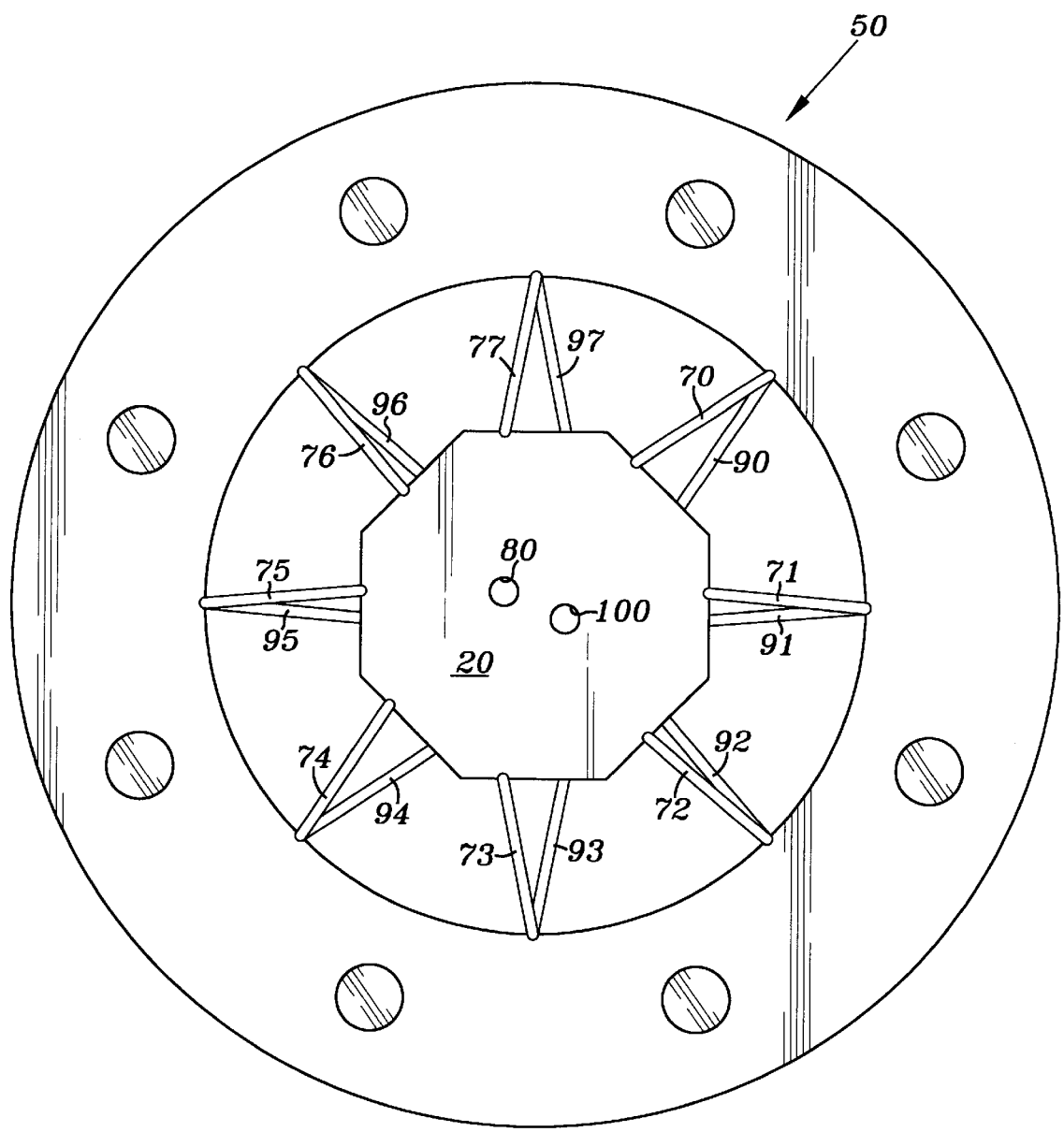
FIG. 6 is an illustration of the flexible conduits connecting the flow channels of the manifold 20 to the oil ports of the toroidal enclosure 50 of FIG. 3.

Referring to FIG. 6, the manifold 20 is shown positioned central to the toroidal enclosure 50 with conduits 70–77 interconnecting upper chamber ports 22 of FIG. 1 with first flow channels formed within the manifold 20. Such flow channels lead to a first oil port 80 of FIG. 6 in the manifold 20, which oil port is in liquid flow communication with flow line 18 of FIG. 1. In like manner the conduits 90–97 of FIG. 6 connect the lower chamber ports 21 of FIG. 1 with second flow channels formed in the manifold 20 that lead to a second oil port 100 of FIG. 6 in the manifold 20. The oil port 100 is in liquid flow communication with the flow line 19 of FIG. 1. In the preferred embodiment, the oil ports 80 and 100 of FIG. 6 extend through the upper surface of the manifold 20.

In operation, when the manifold 20 receives oil under pressure into one of oil ports 80 and 100, oil of lower pressure exits from the other of the oil ports. By way of example, when oil under pressure is received at oil port 80, the oil is channeled by manifold 20 to conduits 70–77 leading to upper chamber ports 22 of FIG. 1, and into chamber 57 of FIG. 4 to force the toroidal piston 30 downward. As a result, residual oil is forced out of the chamber 58 through the lower chamber ports 21 of FIG. 1, and applied by way of conduits 90–97 of FIG. 6 through manifold 20 and out oil port 100 to flow line 19 of FIG. 1. In like manner, if oil under pressure is received into oil port 100 of manifold 20 as illustrated in FIG. 6, the oil is channeled by manifold 20 to conduits 90–97 leading to the lower chamber ports 21 of FIG. 1, and into the chamber 58 of FIG. 4 to force the toroidal piston 30 to move upward. As a result, the residual oil in chamber 57 is forced out through port 55 of upper chamber ports 22 of FIG. 1, and is channeled by manifold 20 to flow line 18 leading to servo valve 15.

Figure 7:
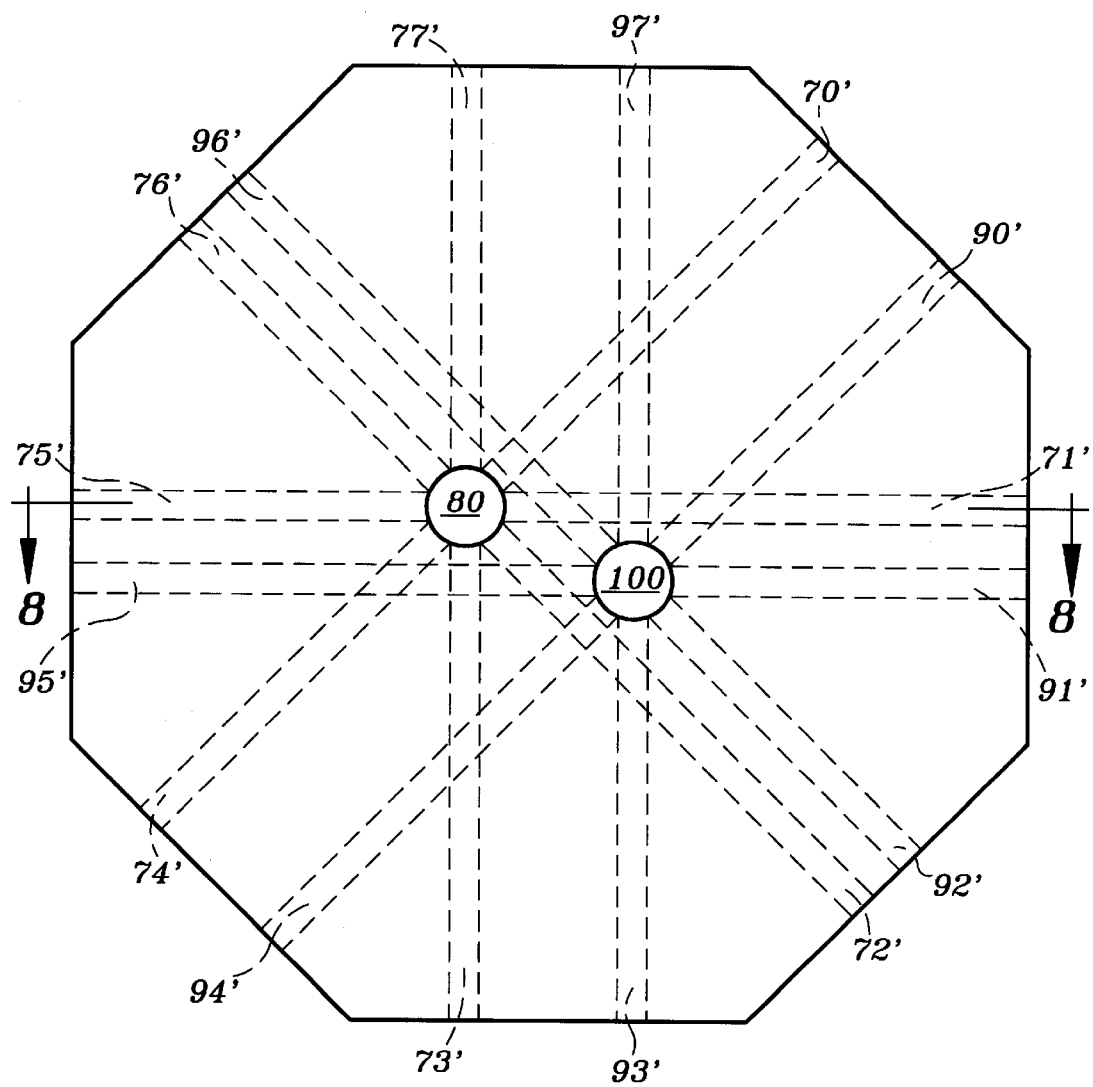
FIG. 7 is an illustration of the flow channels formed within the manifold 20 of FIG. 1.

FIG. 7 illustrates the flow channels 70'–77' formed within manifold 20 which emanate radially from oil port 80 to respectively connect to the conduits 70–77 of FIG. 6. The flow channels 90'–97' of FIG. 7 in like manner emanate from the oil port 100 of manifold 20 to connect respectively to the conduits 90–97 of FIG. 6.

Figure 8:
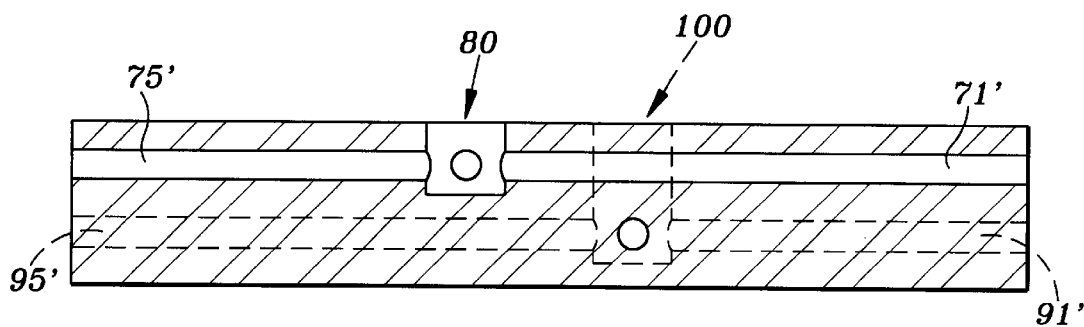
FIG. 8 is a cross-sectional view of the manifold 20 of FIG. 1 along line 8—8 of FIG. 7.

FIG. 8 is a cross-sectional view of the manifold 20 along line 8—8 of FIG. 7, and illustrates the relative position of the oil port 80 with respect to the oil port 100 of manifold 20, and the location of flow channels 71' and 75' with respect to flow channels 91' and 95'.

Although a preferred embodiment of the invention has been described and illustrated herein, it is recognized that modifications and variations may readily occur to those skilled in the art without departing from the true spirit and scope of the invention as defined in the claims, and consequently it is intended that the claims be interpreted to cover such modifications, variations, and equivalents.

What is claimed is:

1. A hydraulic actuator, which comprises:
   a toroidal enclosure having plural upper chamber ports and plural lower chamber ports, an upper end surface, and a lower end surface;
   a toroidal piston slidably seated within said toroidal enclosure and defining an upper hydraulic chamber and a lower hydraulic chamber within said toroidal enclosure, wherein said upper hydraulic chamber is in liquid flow communication with said plural upper chamber ports and said lower hydraulic chamber is in liquid flow communication with said plural lower chamber ports; and a plurality of double ended piston rods perpendicular to and positioned about a surface of said toroidal piston, said plurality of double ended piston rods extending in parallel above and below said toroidal piston, and slidably through and in fluid sealed relation with said upper end surface and said lower end surface.

2. A hydraulic vibrator system for imparting a vibrating force to a mass, which comprises:

a toroidal enclosure having plural upper chamber ports and plural lower chamber ports, an upper end surface, and a lower end surface;

a toroidal piston slidably seated within said toroidal enclosure and defining an upper liquid chamber within said toroidal enclosure which is in liquid flow communication with said plural upper chamber ports, and a lower liquid chamber within said toroidal enclosure which is in liquid flow communication with said plural lower chamber ports;

a plurality of double ended piston rods perpendicular to and affixed about a surface of said toroidal piston, said plurality of double ended piston rods extending in parallel above and below said toroidal piston, and slidably through and in fluid sealed relation with said upper end surface and said lower end surface;

a hydraulic pump for supplying a hydraulic liquid under high pressure;

a high pressure accumulator receiving said hydraulic liquid under high pressure from said hydraulic pump;

a manifold having a first set of plural internal flow paths and a second set of plural internal flow paths;

a servo valve receiving said hydraulic liquid from said high pressure accumulator, and channeling said hydraulic liquid to one of said first set and said second set;

a control unit in electrical communication with said servo valve to cause said servo valve to direct said hydraulic liquid received from said high pressure accumulator alternately to said first set and to said second set, and to direct flow of said hydraulic liquid received from said manifold;

plural liquid conduits respectively connecting said first set to said plural upper chamber ports, and said second set to said plural lower chamber ports; and a low pressure accumulator receiving said hydraulic liquid from said manifold by way of said servo valve, and supplying said hydraulic liquid to said hydraulic pump.

3. A method of imparting a vibration force to a mass, which comprises the steps of:

forming a toroidal enclosure having plural upper chamber ports and plural lower chamber ports in liquid flow communication with an internal annular chamber;

inserting a toroidal piston inside of and in coaxial alignment with said toroidal enclosure so as to separate said internal annular chamber into an upper hydraulic chamber in liquid communication with said plural upper chamber ports, and a lower hydraulic chamber in liquid flow communication with said plural lower chamber ports;

affixing plural double ended piston rods perpendicular to and about a surface of said toroidal piston, with said plural double ended piston rods extending in parallel above and below said toroidal piston, and slidably through and in fluid sealed relation with upper and lower surfaces of said toroidal enclosure;

placing lower ends of said plural parallel piston rods in contact with said mass to distribute said vibration force over a surface area of said mass; and alternately inserting said hydraulic liquid under pressure through said plural upper chamber ports into said upper hydraulic chamber, and through said plural lower chamber ports into said lower hydraulic chamber to force said toroidal piston into a reciprocating motion to generate said vibration force.

4. The hydraulic actuator of claim 1, wherein said toroidal enclosure is a reaction mass.

5. The hydraulic actuator of claim 1, wherein said toroidal enclosure abuts a reaction mass.

6. The method of claim 3, wherein said toroidal piston exhibits a symmetrical displacement of stroke during said reciprocating motion.

\* \* \* \* \*